(12) United States Patent
Rahmani et al.

(10) Patent No.: US 10,452,091 B2
(45) Date of Patent: Oct. 22, 2019

(54) CONTROL METHOD OF A VIRTUAL GENERATOR

(71) Applicant: Schneider Electric Industries SAS, Rueil-Malmaison (FR)

(72) Inventors: Mustapha Rahmani, Saint Martin d'Heres (FR); Yann Herriot, Voiron (FR); Caroline Guyon-Aubert, Crolles (FR); David Gualino, St Ismier (FR); Alain Dentella, Beaucroissant (FR); Sylvain Lechat-Sanjuan, Grenoble (FR); Grace Gandanegara, Saint Martin le Vinoux (FR)

(73) Assignee: SCHNEIDER ELECTRIC INDUSTRIES SAS, Rueil-Malmaison (FR)

(*) Notice: Subject to any disclaimer, the term of this patent is extended or adjusted under 35 U.S.C. 154(b) by 345 days.

(21) Appl. No.: 15/400,262

(22) Filed: Jan. 6, 2017

(65) Prior Publication Data

US 2017/0235322 A1    Aug. 17, 2017

(30) Foreign Application Priority Data

Feb. 16, 2016  (FR) ...................................... 16 51248

(51) Int. Cl.
  *G05F 1/66*   (2006.01)
  *H02J 3/18*   (2006.01)
  (Continued)

(52) U.S. Cl.
  CPC .............. *G05F 1/66* (2013.01); *H02J 3/1814* (2013.01); *H02J 3/1821* (2013.01); *H02J 3/38* (2013.01);
  (Continued)

(58) Field of Classification Search
  CPC ........................................................ G05F 1/66
  See application file for complete search history.

(56) References Cited

U.S. PATENT DOCUMENTS

2015/0115721 A1    4/2015 Norrga et al.

FOREIGN PATENT DOCUMENTS

WO    WO 2012/116559 A1    9/2012

OTHER PUBLICATIONS

French Preliminary Search Report dated Sep. 7, 2016 in French Application 16 51248, filed on Feb. 16, 2016 ( with English Translation of Categories of Cited Documents).

(Continued)

*Primary Examiner* — Tejal Gami
(74) *Attorney, Agent, or Firm* — Oblon, McClelland, Maier & Beustadt, L.L.P.

(57) ABSTRACT

A method for controlling a virtual generator including at least one renewable power source, an accumulation system including a power and/or energy reserve, an inverter and a control law, the virtual generator delivering an active P/reactive Q electrical power of voltage V and of current I to a microgrid, the voltage V and current I having a frequency f, the active P/reactive Q electrical power controlling, via droop control, the frequency f and the RMS voltage $V_{rms}$ of the voltage V, respectively, the method including control of the virtual generator via the control law for which it carries out an adjustment of the active P/reactive Q power delivered to the microgrid, the adjustment being capable of compensating for a variation in the active/reactive power consumed by the microgrid.

17 Claims, 4 Drawing Sheets

(51) Int. Cl.
*H02J 5/00* (2016.01)
*H02J 3/38* (2006.01)
(52) U.S. Cl.
CPC ............... *H02J 3/382* (2013.01); *H02J 5/00* (2013.01); *G05B 2219/2619* (2013.01); *Y02E 40/18* (2013.01); *Y02P 80/14* (2015.11)

(56) References Cited

OTHER PUBLICATIONS

Miguel Torres et al. "Virtual Synchronous Generator: A Control Strategy to Improve Dynamic Frequency Control in Autonomous Power Systems", Energy and Power Engineering, 2013, 7 pages.
Hussam Alatrash et al. "Generator Emulation Controls for Photovoltaic Inverters", IEEE Transactions on Smart Grid, vol. 3, No. 2, 2012, 16 pages.

CONTROL METHOD OF A VIRTUAL GENERATOR

TECHNICAL FIELD

The present invention relates to the field of microgrids for the generation and distribution of electricity. More particularly, the invention relates to a method for controlling a virtual generator, along with a virtual generator allowing the operation of a generator set (also called an engine-generator or a genset) to be reproduced.

PRIOR ART

A microgrid is generally a local electrical grid intended to generate and distribute electrical power in regions that are isolated and far from large electrical energy generation centres. Isolated regions are, for example, islands, mountainous regions or desert areas. The microgrid principle is also applicable when a building, neighbourhood, campus or other entity connected to a wide distribution grid wishes to manage the generation of its energy differently and increase its capacity for resilience.

The main advantage of microgrids is that they operate autonomously (in island mode, without connection to the public grid) and are located in proximity to the areas of consumption (the loads). Thus, the losses inherent to long-distance distribution grids are limited.

The energy autonomy of the microgrid is generally provided for by various types of electrical power sources, of which generator sets play an important role (synchronous power sources are spoken of in this case). Specifically, from an economic point of view, a generator set represents a small initial investment and provides for electricity generation that is flexible enough to absorb spikes in consumption at peak times. However, their operation requires large quantities of diesel fuel, which consequently increases the energy bill as well as adding to atmospheric pollution.

In order to overcome these environmental and economic problems, microgrids are hybrid and also comprise renewable power sources such as photovoltaic power sources. To this end, the virtual generator, or synchronous virtual generator, concept, comprising a synchronous virtual machine, has been developed and those skilled in the art will be able to consult the document [1] which describes the fundamentals of virtual generators in detail. A virtual generator comprises, in general, a system for generating electricity, such as photovoltaic panels, and an inverter. The photovoltaic panels then produce electrical power by generating a DC current and a DC voltage. Said DC current and DC voltage are subsequently converted by the inverter to an AC current and an AC voltage. The inverter generally operates according to a control law so as to emulate the behaviour of a synchronous generator with droop, hence the name virtual generator. It is thus possible to electrically connect synchronous generators and virtual generators in parallel.

However, the generation cycles of renewable power sources are governed by daily cycles and weather conditions (intermittent electrical power generation is also spoken of). For example, photovoltaic panels generate electrical power only during the daytime and with sufficient insolation. There is therefore not always a perfect match between the power consumed by the microgrid and the power generated by the renewable power sources. Stated otherwise, the peaks in electrical power generated by the renewable power sources do not correspond to the peaks in consumption. It has therefore been proposed to couple the inverters to a central energy accumulation system dimensioned for the entire microgrid, capable of delivering electrical energy during the consumption peaks and of storing any surplus energy generated by the renewable power sources during the generation peaks.

However, this solution is based on an overall central accumulation system dimensioned for a given grid, and is therefore not scalable. Specifically, the addition of extra photovoltaic panels may require the replacement of the central energy accumulation system.

Additionally, the cost of this solution is not compatible with the savings desired when setting up a microgrid.

Furthermore, unlike a generator set, the electrical power delivered by the renewable power source is subject to fluctuations in weather, de facto generating electrical power that fluctuates. For example, the level of insolation may vary very quickly, and by tiny amounts, generating peaks and troughs in the electrical power generated by a photovoltaic panel. These fluctuations are a source of instability that the microgrid cannot tolerate.

Moreover, a conventional inverter supplied with electrical power, for example by a renewable power source, may generally not form the grid. It is said to be grid tied. In contrast, a system forming the grid is said to be grid forming. Forming the grid is understood to mean generating an AC voltage of well defined frequency and amplitude which are either constant or follow a droop curve.

Thus, the portion of renewable power sources may not exceed, by convention, a value of between 20 and 30% (the degree of penetration of renewable power sources is spoken of) such that at least one non-intermittent electrical power generation means, for example a generator set or engine-generator, is in continuous operation. This limitation endows the microgrid with the necessary stability, but de facto limits the savings that can achieved.

One aim of the invention is then to propose a method for controlling a virtual generator and a virtual generator making it possible to improve the match between the electrical power generated by the virtual generator and the electrical power actually consumed by the load.

Another aim of the invention is, additionally, to propose a method for controlling a virtual generator and a virtual generator making it possible to decrease (smooth) the effect, on the microgrid, of fluctuations in electrical power from the renewable power source.

Another aim of the invention is also to propose a method for controlling a virtual generator and a virtual generator making it possible to increase the degree of penetration of intermittent renewable power sources without negatively affecting the stability of the microgrid.

SUMMARY OF THE INVENTION

The aims of the invention are achieved, at least in part, by a method for controlling a virtual generator comprising at least one renewable power source, an accumulation system comprising a power and/or energy reserve, an inverter and a control law, the virtual generator delivering to a microgrid an active P electrical power and reactive Q electrical power having a voltage V and a current I, said voltage V and current I having a frequency f, said active P/reactive Q electrical power controlling, via droop control, the frequency f and the RMS voltage $V_{rms}$ of the voltage V, respectively, the method comprising control of the virtual generator via the control law for which it carries out an adjustment of the active P/reactive power delivered to the microgrid, said adjustment being capable of compensating for a variation in the active/reactive power consumed by the microgrid.

Compensating for a variation in the active/reactive electrical power consumed by the microgrid is understood to mean delivering additional active/reactive electrical power in the event of draw by the microgrid, and decreasing the active/reactive power delivered as soon as the consumption of the microgrid decreases. Compensating for the variation in the active P/reactive Q electrical power is carried out so as to balance the active P/reactive Q electrical power delivered by the virtual generator with the active P/reactive Q electrical power consumed by the microgrid. The implementation of said compensation is made possible by the presence of an accumulation system and its power and/or energy reserve. The power and/or energy reserve may deliver active P/reactive Q power to the microgrid during a power draw. The accumulation system is also capable of accumulating the active P/reactive Q power generated by the renewable power source but not consumed by the microgrid.

Thus, the method according to the invention makes it possible to reproduce the inertia of a generator set, thus conferring the stability required to supply active P/reactive Q power to the microgrid. Specifically, the control law makes it possible to balance the active P/reactive Q power delivered and consumed by the virtual generator and the microgrid, respectively. The control law comprises the differential equations (the electromechanical equations) governing the operation of a generator set, and, inter alia, the mechanical differential equation modelling the dynamics of a rotor of said generator set. The control law according to the invention therefore makes the virtual generator behave as a generator set.

This behaviour caused by the control law is achievable by virtue of the accumulation system which forms an integral part of the virtual generator according to the invention.

Unlike the prior art, the virtual generator comprising the renewable power source, as well as the accumulation system, is adapted to the needs of the microgrid without the latter being affected.

Furthermore, compensating for the variation in the active P/reactive Q power consumed by the microgrid also causes an adjustment in the frequency f of the voltage V and in the RMS voltage $V_{rms}$ of the voltage V, respectively, through droop.

According to one embodiment, the accumulation system applies a DC voltage $V_{ref}$ to first terminals of the renewable power source so that the renewable power source delivers a power $P_{sr}$, said power $P_{sr}$ is liable to exhibit power fluctuations, the accumulation system is controlled in order to compensate for the fluctuations.

The accumulation system may also absorb (store) electrical power whenever the latter is not consumed by the microgrid. Thus, peaks in fluctuations of the electrical power generated by the renewable power source are absorbed by the accumulation system. Thus, the fluctuations in electrical power from the renewable power source are compensated for within the virtual generator by the accumulation system. Consequently, the effect, on the microgrid, of fluctuations in power from the renewable power source is reduced.

According to one embodiment, the control law is capable of endowing the virtual generator with the possibility to form the grid, advantageously via the inverter.

According to one embodiment, the control law is capable of connecting the virtual generator in parallel with the generator sets.

According to one embodiment, the DC voltage $V_{ref}$ applied to the first output terminals is the result of the conversion of a DC voltage $V_{PS}$, at the terminals of a storage system, by a DC/DC converter, the storage system and the DC/DC converter being included within the accumulation system.

The power delivered by the renewable power source is dependent on the DC voltage $V_{ref}$ applied by the accumulation system.

Thus, the accumulation system may adjust the power $P_{sr}$ generated by the renewable power source depending on the needs of the microgrid. Stated otherwise, the accumulation system may limit the electrical power generated by the renewable power source when the consumption of the grid decreases.

According to one embodiment, the voltage $V_{ref}$ is determined as a function of a setpoint power $P_{sr}$ that must be delivered by the renewable power source, the voltage is determined by the accumulation system.

The power delivered by the renewable power source is dependent on the DC voltage $V_{ref}$ applied by the accumulation system.

Thus, the accumulation system may adjust the power $P_{sr}$ generated by the renewable power source depending on the needs of the microgrid. Stated otherwise, the accumulation system may limit the electrical power generated by the renewable power source when the consumption of the microgrid decreases.

Furthermore, the accumulation system may also limit the power delivered by the renewable power source as soon as said system is no longer capable of absorbing any extra electrical power liable to be generated by the renewable power source and consumed by the microgrid. Stated otherwise, as soon as the state of charge of the accumulation system exceeds a given threshold, it is liable to adjust the voltage $V_{ref}$ so that the power $P_{sr}$ generated by the renewable power source is entirely consumed by the microgrid.

According to one embodiment, the voltage $V_{ref}$ is determined by a voltage sweep, for example in stages, of the first output terminals, and by simultaneously measuring the amperage of the current produced by the renewable power source and said voltage.

According to one embodiment, the voltage sweep produces power variations in the power delivered by the renewable power source, the accumulation system is controlled in order to compensate for said variations during said sweep. According to one embodiment, the method comprises a step of measuring a state of charge of the accumulation system.

According to one embodiment, the voltage $V_{ref}$ is adjusted so that, when the state of charge of the accumulation system is above or equal to a predetermined maximum charge threshold $SoC_{max}$, the power $P_{sr}$ is entirely consumed by the microgrid.

According to one embodiment, the state of charge of the accumulation system SoC is maintained at a value that is higher than a minimum state of charge $SoC_{min}$.

According to one embodiment, a power $P_{acc}$ is delivered by the accumulation system to the microgrid, via the inverter, when said microgrid has to consume extra power $P_{sur}$ that the renewable power source is incapable of providing.

The invention also relates to a virtual generator, capable of delivering an active P/reactive Q electrical power of frequency f and RMS voltage $V_{rms}$ to a microgrid comprising:

a renewable power source;

an accumulation system comprising a power and/or energy reserve;

an inverter;

a control law;

the control law being capable of controlling the virtual generator so that the virtual generator delivers to the microgrid an active P electrical power and reactive Q electrical power having a voltage V and a current I, said voltage V and current I having a frequency f, said active P/reactive Q electrical power controlling, via droop control, the frequency f and the RMS voltage $V_{rms}$ of the voltage V, respectively, and that the virtual generator carries out an adjustment of the active P/reactive Q power delivered to the microgrid when a variation in the active/reactive power consumed by the microgrid occurs, said adjustment being capable of compensating for the variation in the active P/reactive Q power consumed.

Compensating for a variation in the active P/reactive Q electrical power consumed by the microgrid is understood to mean delivering additional active P/reactive Q electrical power in the event of draw by the microgrid, and decreasing the active P/reactive Q power delivered as soon as the consumption of the microgrid decreases. Compensating for the variation in the active P/reactive Q electrical power is carried out so as to balance the active P/reactive Q electrical power delivered by the virtual generator with the active P/reactive Q electrical power consumed by the microgrid. The implementation of said compensation is made possible by the presence of the accumulation system and its power and/or energy reserve. The power and/or energy reserve may deliver active P/reactive Q power to the microgrid during a power draw. The accumulation system is also capable of accumulating the active P power generated by the renewable power source but not consumed by the microgrid.

Thus, the virtual generator according to the invention makes it possible to reproduce the inertia of a generator set, thus conferring the stability required to supply active P/reactive Q power to the microgrid. Specifically, the control law makes it possible to balance the active P/reactive Q power delivered and consumed by the virtual generator and the microgrid, respectively. The control law comprises the differential equations (the electromechanical equations) governing the operation of a generator set, and, inter alia, the mechanical differential equation modelling the dynamics of a rotor of said generator set. The control law according to the invention therefore makes the virtual generator behave as a generator set.

This behaviour caused by the control law is achievable by virtue of the accumulation system which forms an integral part of the virtual generator according to the invention.

Unlike the prior art, the virtual generator comprising the renewable power source, as well as the accumulation system, is adapted to the needs of the microgrid without the latter being affected.

Furthermore, compensating for the variation in the active P/reactive Q power consumed by the microgrid also causes an adjustment in the frequency f and in the RMS voltage $V_{rms}$, respectively, through droop.

According to one embodiment, the control law is capable of endowing the virtual generator with the possibility to form the grid, advantageously via the inverter.

According to one embodiment, the control law is capable of connecting the virtual generator in parallel with the generator sets.

According to one embodiment, the accumulation system comprises a storage system and a DC/DC converter, the DC/DC converter connecting the output terminals of the storage system to first output terminals of the renewable power source, and is capable of delivering a voltage $V_{ref}$ to the first output terminals, according to a setpoint imposed by the control law, from a DC voltage $V_{PS}$ delivered to the output terminals of the storage system.

According to one embodiment, the control law is capable of determining the voltage $V_{ref}$ as a function of a setpoint power $P_{sr}$ that must be delivered by the renewable power source via the accumulation system.

The power delivered by the renewable power source is dependent on the DC voltage $V_{ref}$ applied by the accumulation system.

Thus, the accumulation system may adjust the power $P_{sr}$ generated by the renewable power source depending on the needs of the microgrid. Stated otherwise, the accumulation system may limit the electrical power generated by the renewable power source when the consumption of the grid decreases.

According to one embodiment, the accumulation system is capable of carrying out a voltage sweep of the first output terminals, and of simultaneously measuring the amperage of the current produced by the renewable power source and said voltage.

According to one embodiment, the control law is capable of making the accumulation system compensate for fluctuations in the power delivered by the renewable power source.

According to one embodiment, the renewable power source comprises photovoltaic panels.

According to one embodiment, the renewable power source comprises wind turbines.

BRIEF DESCRIPTION OF THE DRAWINGS

Other features and advantages will become apparent in the following description of modes of implementation of the method for controlling a virtual generator according to the invention, given by way of non-limiting examples and with reference to the appended drawings in which.

DETAILED DESCRIPTION OF PARTICULAR EMBODIMENTS

Figure 1A:
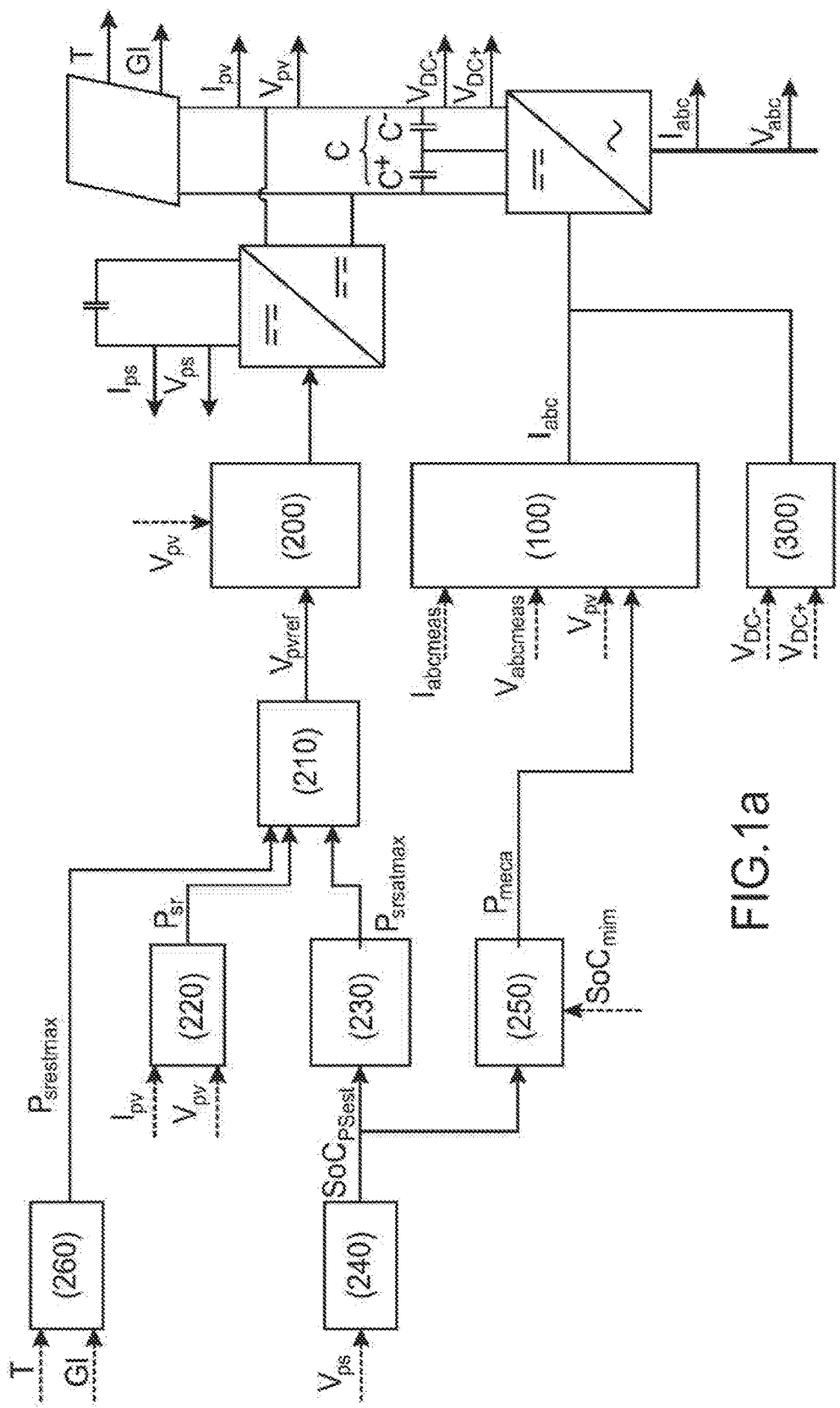
FIG. 1a is a schematic representation of a virtual generator according to the invention comprising a renewable power source, an accumulation system, an inverter and a control law, the control law comprising the blocks 100, 200, 210, 220, 230, 240, 250, 260 and 300.
Figure 1B:
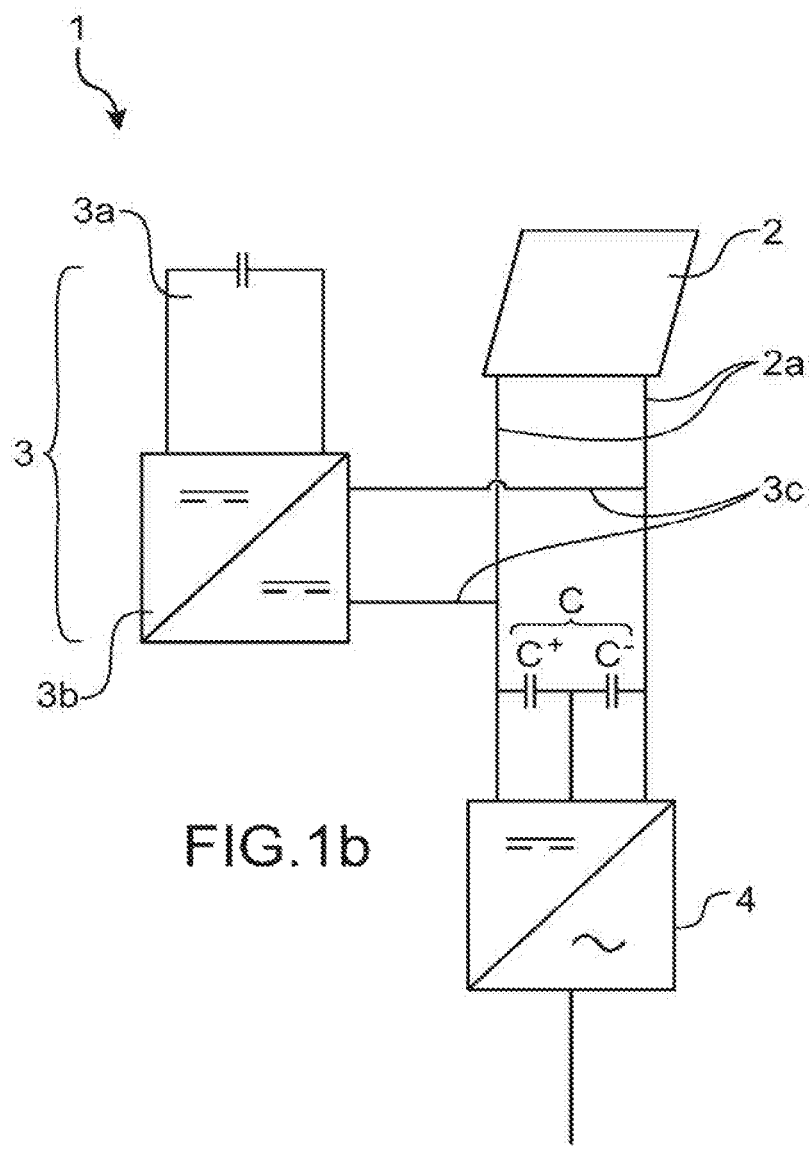
FIG. 1b is a schematic representation of a virtual generator according to the invention.

FIGS. 1a and 1b represent a virtual generator 1 according to the invention.

The virtual generator 1 is understood to be a virtual generator 1 behaving as a generator set. The generator set delivers an active P/reactive Q electrical power of voltage V and of current I to a microgrid, said voltage V and current I having a frequency f. The active P/reactive Q power controls, via droop control, the frequency f and the RMS voltage $V_{rms}$ of the voltage V, respectively.

Figure 3:
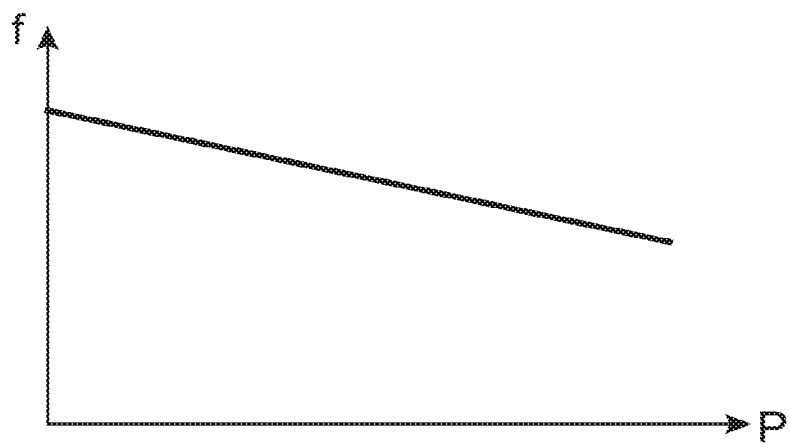
FIG. 3 is a representation of the frequency f of the current and of the voltage as a function of the active power P delivered by a generator set, the frequency f being represented on the vertical axis and the active power P on the horizontal axis.

The droop control of the frequency f by the active power P delivered by the generator set is illustrated in FIG. 3. The frequency f varies according to a linear function of the relative active power P (as a percentage) delivered by the generator set. The linear function is characterized by a slope D referred to as a droop. The frequency f of the voltage V and of the current I that are delivered by the generator set depends on the rotational speed of the shaft of the generator set. Thus, whenever the active power P delivered by the generator set varies, the rotational speed of the shaft adapts itself so that the frequency f of the voltage and of the current that are associated with the active electrical power P is also adjusted. This regulation of the rotational speed of the engine shaft of the generator set is carried out by a speed regulation block (the "Governor" block).

Figure 4:
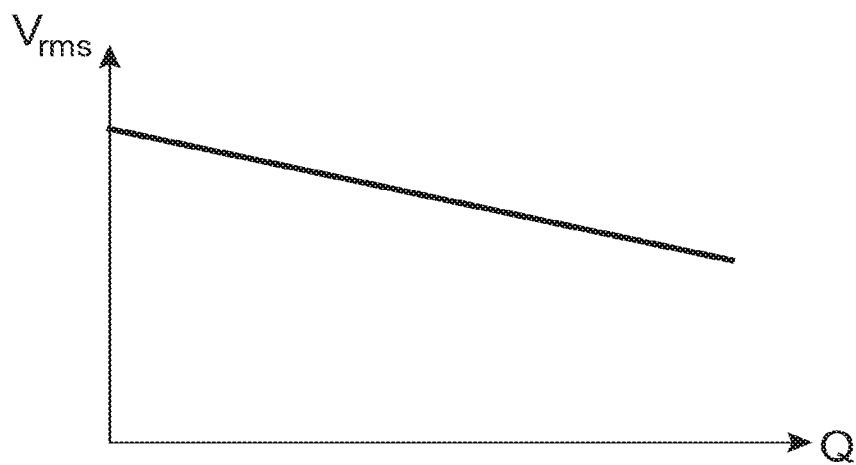
FIG. 4 is a representation of the RMS voltage $V_{rms}$ of the voltage V as a function of the reactive power Q delivered by the generator set, the RMS voltage $V_{rms}$ being represented on the vertical axis and the reactive power Q on the horizontal axis.

The droop control of the RMS voltage $V_{rms}$ of the voltage V by the reactive power Q delivered by the generator set is illustrated in FIG. 4. The RMS voltage $V_{rms}$ varies according to a linear function of the relative reactive power Q (as a percentage) delivered by the generator set. The linear function is characterized by a slope D referred to as a droop. The RMS voltage $V_{rms}$ is dependent on the reactive power Q delivered by the generator set. Thus, whenever the reactive power Q delivered by the generator set varies, the RMS voltage $V_{rms}$ is adjusted depending on the reactive electrical power Q. A generator set generally comprises a rotor rotationally driven within a stator and an automatic voltage regulator (AVR) acting on the windings of the rotor. The automatic voltage regulator thus applies a voltage to the rotor windings depending on the RMS voltage $V_{rms}$ (of the voltage V) delivered by the stator (by the generator set) on the microgrid. The voltage/reactive power Q droop control allows the generator set to adapt the RMS voltage $V_{rms}$ that it delivers depending on the reactive electrical power Q that it provides.

Furthermore, the rotor of a generator set is generally rotationally driven within a stator by a shaft of an internal combustion engine (for example a diesel engine). By virtue of its design, the generator set is capable of forming the grid. Stated otherwise, the generator set may impose the voltage V and the frequency f on an electrical grid.

Additionally, the rotational kinetic energy of the rotor of the generator set depends on the mass and the rotational speed of the rotor, which may be transferred to the microgrid in the form of active power P. Thus, the generator set may respond to a power draw by the microgrid (a need to consume additional power) by extracting the kinetic energy from the shaft and transferring it to the microgrid. The generator set then adjusts the frequency f of the delivered active power P through droop control. The generator set is capable of responding to a variation in demand for active power; it is said that the generator set has inertia. In an equivalent manner, the generator set may respond to a variation in demand for active power from the microgrid. As soon as the reactive power Q that it delivers to the microgrid is adapted, the generator set adjusts, via droop control, the RMS voltage $V_{rms}$ of the voltage V. The capability of the generator set to respond to a variation in consumption of the active P/reactive Q power by the microgrid may be associated with the concept of spinning reserve. The concepts of inertia and spinning reserve of a generator set can be modelled using differential equations. For example, from among the differential equations, the mechanical equation for the rotor of the generator set may be given by way of example:

$$\frac{d\omega_r}{dt} = \frac{1}{2H_d}\Gamma_{mot} - \frac{1}{2H_d}\Gamma_e - \frac{D_d}{2H_d}\omega_r$$

$\omega_r$ is the angular speed of the rotor, $\Gamma_{mot}$ is the torque of the engine, $\Gamma_e$ is the electromagnetic torque of the synchronous generator, $H_d$ is the moment of inertia of the rotor and $D_d$ is the coefficient of friction. The differential equations allow the electrical and mechanical behaviour of the generator set to be modelled.

The virtual generator 1, according to the invention, is controlled by a control law that integrates the differential equations allowing the operation (the behaviour) of the generator set to be modelled. Thus, the virtual generator 1 is configured to emulate the behaviour of a synchronous generator, and, more particularly, that of a generator set. Configuring of the virtual generator 1 then comprises determining the differential equations governing the operation of the synchronous generator and the development of a computer program (or an algorithm) based on said differential equations. This configuration is known from the techniques of those skilled in the art and is described in the document [2].

According to the present invention, the virtual generator 1 is controlled by the control law so that it carries out an adjustment of the active P/reactive Q power delivered to the microgrid, said adjustment being capable of compensating for a variation in the active/reactive power consumed by the microgrid. Compensating for the variation in the active/reactive electrical power is carried out so as to balance the active P/reactive Q electrical power delivered by the virtual generator 1 with the active P/reactive Q electrical power consumed by the microgrid.

The virtual generator 1 comprises a renewable power source 2, a power and/or energy accumulation system 3, an inverter 4 and the control law.

Throughout the rest of the text, the expression "accumulation system 3" will be used to refer to the power and/or energy accumulation system 3.

Throughout the description, a current and voltage delivered by the inverter 4 or a current and voltage delivered by the virtual generator 1 will have the same meaning.

The control law may comprise various control blocks.

For example, the control law may comprise:
- a block 100 referred to as "Virtual Generator with droop";
- a block 200 referred to as "DC bus regulation";
- a block 210 referred to as "Constrained MPPT";
- a block 220 referred to as "$P_{sr}$ calculation";
- a block 230 referred to as "Power Storage overcharge management";
- a block 240 referred to as "Power Storage state of charge estimator";
- a block 250 referred to as "Power Storage undercharge management";
- a block 260 referred to as "$P_{maxpv}$ estimator";
- a block 300 referred to as "Midpoint regulation".

The function of the various blocks will be described in detail in the rest of the description with reference to FIG. 1a.

The renewable power source 2 may be subject to the vagaries of weather, and consequently be an unstable power source; it is then qualified as an intermittent renewable power source.

The renewable power source 2 may comprise photovoltaic panels, wind turbines, water turbines or thermodynamic machines.

Figure 2A:
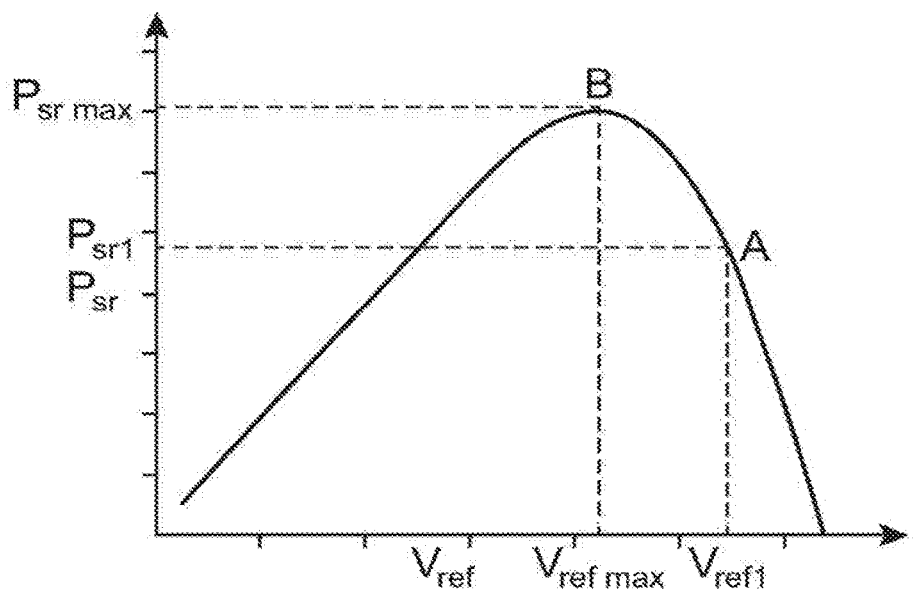
FIG. 2a represents, for a given level of insolation, the power $P_{sr}$ (along the vertical axis) generated by a photovoltaic panel and delivered by its first output terminals, as a function of the voltage $V_{ref}$ (along the horizontal axis) applied to said first output terminals.

The renewable power source 2 comprises first output terminals 2a which are liable to deliver a DC current and a DC voltage. The renewable power source 2 generally generates a certain amount of power $P_{sr}$, delivered via its first output terminals 2a, depending on the voltage $V_{ref}$ applied to said first output terminals 2a. For example, as illustrated in FIG. 2a, for a given level of insolation, photovoltaic panels generate power (along the vertical $P_{sr}$ axis) in a bell shape as a function of the voltage (along the horizontal $V_{ref}$ axis) applied to the first output terminals 2a. For a voltage $V_{ref}$ that is equal to $V_{ref1}$, the photovoltaic panel is able to deliver the power $P_{sr1}$ (point A in FIG. 2a), while it is able to deliver the power $P_{srmax}$ when the voltage $V_{ref}$ is equal to $V_{refmax}$ (point B in FIG. 2a).

The accumulation system 3 comprises second output terminals 3c which are also liable to deliver a DC current and a DC voltage. The accumulation system 3 may comprise a storage system 3a and a DC/DC converter 3b (a DC/DC converter converts one DC voltage to another DC voltage). The storage system 3a may comprise at least one electrochemical battery, flywheel or capacitor (or supercapacitor). A supercapacitor is understood to be a capacitor employing particular technology that allows a power density and an energy density that is intermediate between conventional electrolytic capacitors and batteries to be obtained. For example, a supercapacitor may comprise a power density of between 1000 and 5000 W/kg, and an energy density of between 4 and 6 Wh/kg. The storage system 3a is capable of delivering a DC voltage $V_{PS}$ to the DC/DC converter 3b, which converts it to another DC voltage $V_{ref}$ delivered via the second output terminals 3c.

The first output terminals 2a and the second output terminals 3c are electrically connected, for example in parallel. Thus, the accumulation system 3 applies a voltage $V_{ref}$ to the first output terminals 2a of the renewable power source 2 so that the renewable power source 2 delivers a power $P_{sr}$. The DC/DC converter 3b may be controlled by a first control board operating according to the control law. Block 200 may be adapted to deliver a signal to the DC/DC converter 3b so that said converter 3b applies the voltage $V_{ref}$ to be applied to the first terminals of the renewable power source 2. As for the inverter 4, it may be controlled by a second control board which also operates according to the control law. Alternatively, the DC/DC converter 3b and the inverter 4 may be controlled by the same control board.

The first set 2a and the second set 3c of output terminals are connected to the input of the inverter 4.

The inverter 4 is capable of converting the DC current and the DC voltage, which are generated by the renewable power source 2 and/or the accumulation system 3, to an AC current and an AC voltage before they are injected into the microgrid.

The control law may advantageously be an algorithm set up in the one or more control boards. Furthermore, the first control board and the second control board may communicate with one another. Communication between the first control board and the second control board allows, in particular, information to be exchanged between said control boards. Among the information exchanged, the following may be given: the state of charge of the accumulation system 3, the currents, voltages and powers measured at the first set 2a and the second set 3c of terminals. The control law is also capable of measuring the voltage, the current and the frequency of said voltage and current delivered to the microgrid.

The control law is also capable of controlling the renewable power and the accumulation power delivered by the renewable power source 2 and the accumulation system 3, respectively. The inverter 4 delivers, to the microgrid, a power corresponding to the powers delivered by the renewable power source 2 and the accumulation system 3. The accumulation power may be a negative power, namely a power consumed by the accumulation system 3, or a positive power, namely a power delivered by said system 3. The accumulation power is positive, for example, when the accumulation system 3 draws power from the inverter 4, intended to be delivered to the microgrid. The accumulation power is negative, for example, when the accumulation system 3 recharges by consuming renewable power. The control law continuously imposes a balance between the accumulation and renewable powers and the power delivered by the inverter 4 to the microgrid. Stated otherwise, the power budget must be balanced.

Thus, the control law of the inverter 4 ensures that the sum of the accumulation and renewable powers is equal to the power delivered by the inverter 4 to the microgrid (it is emphasized that the power delivered by the inverter 4 to the microgrid is indeed consumed by the microgrid).

The control law, for example via block 100, makes the inverter 4 deliver an AC current of amperage $I_{abc}$. The reference value of the current $I_{abc}$ may be determined by block 100 depending on the voltage $V_{abc}$ delivered by the inverter 4 and measured at its output ($V_{abcmes}$). Thus, the inverter 4 reproduces the current $I_{abc}$ of a generator set delivering a voltage $V_{abc}$ and responding to the differential equations modelling said generator set.

The control law of the inverter 4 is also capable, according to techniques known to those skilled in the art, of endowing the virtual generator 1 with the possibility of forming the grid. Thus, the virtual generator 1 may be alone in delivering electrical power to the microgrid, just as would be done by a generator set.

In a particularly advantageous manner, the virtual generator 1 features frequency f/active power P droop control. Frequency f/active power P droop control is a characteristic of a synchronous generator, such as a generator set. A generator set generally comprises a shaft driven by a diesel engine, the angular rotation of the shaft having a frequency corresponding to the frequency f of the current and of the voltage generated by said group. The frequency of the shaft follows a frequency f/active power P droop control according to a law shown in FIG. 3. The frequency f/active power P droop control allows the generator set to adapt the frequency f of the signal that it delivers depending on the active electrical power P that it provides. This droop effect makes it possible to connect various generator sets in parallel, which will deliver a current and a voltage of the same frequency f, on the grid. In the context of the virtual generator 1 according to the invention, the frequency f of the current and of the voltage delivered by said virtual generator 1 depends on the specifications of the microgrid (grid code). For example, the frequency f may be between 48 and 52 Hz, or else between 49.5 and 50.5 Hz, or between 58 and 62 Hz, or else between 59.5 et 60.5 Hz.

Again in a particularly advantageous manner, the virtual generator 1 also features RMS voltage $V_{rms}$/reactive power Q droop control. RMS voltage $V_{rms}$/reactive power Q droop control is a characteristic of a synchronous generator, such as a generator set. A generator set generally comprises a rotor rotationally driven within a stator and an automatic voltage regulator (AVR) acting on the windings of the rotor. The automatic voltage regulator thus applies a voltage to the rotor depending on the voltage of the electrical signal (hence the power) delivered by the stator (by the generator set) on the microgrid. The RMS voltage $V_{rms}$ of the electrical signal delivered by the generator set follows an RMS voltage $V_{rms}$/reactive power Q droop control according to a law shown in FIG. 4. The RMS voltage $V_{rms}$/reactive power Q droop control allows the generator set to adapt the RMS voltage $V_{rms}$ of the voltage that it delivers depending on the reactive electrical power Q that it provides. In the context of the virtual generator 1 according to the invention, the voltage delivered by said virtual generator 1 depends on the specifications of the microgrid (grid code).

The frequency f/active power P or voltage/reactive power Q droop control may be included within the control law of the virtual generator 1 according to techniques known to those skilled in the art. To this end, the document [3] presents a method allowing an inverter to be operated according to frequency f/active power P or RMS voltage $V_{rms}$/reactive power Q droop control. More particularly, the operation of the inverter according to frequency f/active power P or RMS voltage $V_{rms}$/reactive power Q droop control may be included in block 100.

The virtual generator 1 may comprise, in the case of a three-level inverter 4, two capacitors $C^+$ et $C^-$ connected together in series to form an equivalent capacitor C. The terminals of the equivalent capacitor C are electrically connected, for example in parallel, to the first output terminals 2a of the renewable power source 2 (and, consequently, are also electrically connected in parallel to the second output terminals 3c of the power and/or energy accumulation source 3). The control law, for example block 300, in this particular case of a three-level inverter 4, is capable of balancing the voltages $V_{DC+}$ and $V_{DC-}$ measured at the respective terminals of the two capacitors $C^+$ and $C^-$ in order to guarantee that the current and the voltage delivered by the inverter 4 to the microgrid have a non-deformed sinusoidal form. The invention is however not limited to the use of a three-level inverter.

The accumulation system 3 comprises the storage system 3a and the DC/DC converter 3b. The second output terminals 3c are the output terminals of the DC/DC converter 3b. Thus, the DC/DC converter 3b imposes the voltage $V_{ref}$ to the first output terminals 2a of the renewable power source 2. The voltage $V_{ref}$ is the result of the conversion, by the converter 3b, of a DC voltage at the terminals of the storage system 3a. However, the value of the voltage $V_{ref}$ is a setpoint imposed on block 200 of the control law operating the DC/DC converter.

In operation, the power delivered by the renewable power source 2 is liable to fluctuate. Fluctuations are understood to be rapid variations, for example on timescales of less than 100 ms, or even less than 10 ms, of low amplitude with respect to the quantity under consideration (in the present case, the power), for example less than 5% of said quantity. In the case of photovoltaic panels, the power fluctuations may, for example, be due to variations in the level of insolation. The fluctuations in electrical power delivered by the renewable power source 2 can be accessed by measuring the amperage $I_{pv}$ of the electrical signal generated by the renewable power source 2. Advantageously, the accumulation system 3 is operated according to the control law in order to compensate for fluctuations in the power delivered by the renewable power source 2 to the input terminals of the inverter 4. Compensating for fluctuations in the power delivered is understood to mean limiting their impact on the microgrid through the absorption thereof. Thus, the current and the voltage that are delivered by the inverter 4 to the microgrid are free of fluctuations. Stated otherwise, they are stable.

Figure 2B:
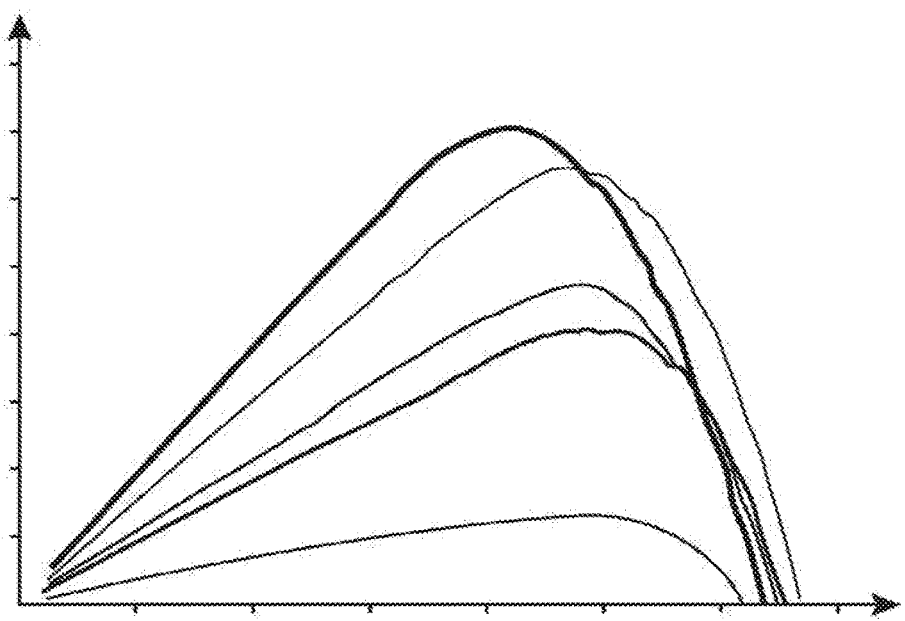
FIG. 2b represents, for various levels of insolation, the power $P_{sr}$ (along the vertical axis) generated by a photovoltaic panel as a function of the voltage $V_{ref}$ (along the horizontal axis) applied to the first output terminals.

Again in an advantageous manner, the control law allows the power from the renewable power source 2 to be regulated. Specifically, the value of the DC voltage $V_{ref}$ applied by the DC/DC converter 3b to the first output terminals 2a of the renewable power source 2 is a setpoint imposed by block 210 of the control law. An objective of the setpoint imposed by the control law may be to make the renewable power source 2 deliver either maximum power or a saturation power, the saturation power being lower than the maximum power that the renewable power source 2 is able to deliver. For example, it is known that the power delivered by photovoltaic panels, for a given level of insolation (see FIG. 2b), is dependent on the voltage applied to their output terminals (the first terminals). Thus, the control law may, in a first instance, determine the voltage $V_{ref}$ to be applied to the first output terminals 2a of the photovoltaic panel so that the latter delivers either all of the power that it is capable of generating, namely $P_{srmax}$ (point B in FIG. 2a) or a power $P_{sr1}$ that is lower than a predetermined power (Point A in FIG. 2a). The power that must be generated by the renewable power source 2 (or, more particularly, by the photovoltaic panel) is dependent on the conditions of a state of charge of the storage system 3a. The concept of state of charge of the storage system 3a will be described in detail in the rest of the description. Thus, in order to determine the voltage $V_{ref}$ to be applied to the first terminals, block 210 of the control law orders the DC/DC converter 3b to carry out a voltage sweep of the first output terminals 2a of the renewable power source 2. During the voltage sweep, the current $I_{pv}$ and the voltage $V_{pv}$ drawn by the renewable power source 2 are measured by block 220 so that the power $P_{sr}$ delivered by said source is known. The voltage sweep $V_{ref}$ is carried out in successive increments, in order of increasing power for example, until the renewable power source 2 delivers the desired power (the power that the renewable power source 2 is able to deliver is nonetheless limited to a power $P_{srmax}$). The voltage sweep may be carried out in less than 10 seconds, for example 5 seconds. During the voltage sweep, the accumulation system 3 compensates for the variation in the power delivered by the renewable power source 2 so that the power consumed by the microgrid and the power delivered by the virtual generator 1 are always in balance. Power compensation is also controlled by the control law, so as to constantly ensure that the power consumed and the power generated are in balance.

Alternatively, block 260, based on known technical data of the renewable power source (for example the power curves of photovoltaic panels depending on the level of insolation and the temperature), it is possible to estimate the maximum power that the renewable power source is able to deliver and communicate it to block 210.

The control law may also be adapted to limit the state of charge of the accumulation system 3 to a maximum state of charge (SoC) $SoC_{max}$. Specifically, in order to avoid degrading the accumulation system 3, it is preferable for the state of charge not to exceed, for example, 100% charge, or even 95% charge. Thus, while the state of charge is lower than SoC$_{max}$, the accumulation system 3 may store, at least in part, any surplus power delivered by the renewable power source 2 but not consumed by the microgrid. The accumulation system 3 thus delivers a negative power. Conversely, as soon as the state of charge of the accumulation system 3 is at least equal to the maximum state of charge SoC$_{max}$, the accumulation system 3 is no longer able to store a potential surplus of power delivered by the renewable power source 2. Thus, it may be necessary to limit the power delivered by the renewable power source 2 to a saturation maximum power P$_{srsatmax}$. The saturation maximum power P$_{srsatmax}$ is then capable of being entirely consumed by the microgrid. To this end, block 240 of the control law may continuously estimate the state of charge SOC$_{PSest}$ of the accumulation system 3. The estimate of the state of charge may, for example, be obtained by measuring the voltage Vps measured at the terminals of the storage system 3a.

This estimate, communicated to block 230, is then compared with the state of charge SoC$_{max}$. Block 230 therefore dynamically provides the reference value P$_{srsatmax}$ for the saturation maximum power that the renewable power source 2 is able to deliver when the state of charge of the accumulation system 3 exceeds SoC$_{max}$. As soon as the state of charge SoC$_{PSest}$ reaches, or exceeds, the value SoC$_{max}$, block 230 communicates the reference value P$_{srsatmax}$ to block 210 (the value P$_{srsatmax}$ also being the maximum power value that the microgrid is able to consume). The reference value of the voltage V$_{ref}$ determined by block 210 is then adapted so that the power delivered by the renewable power source 2 is lower than or equal to P$_{srsatmax}$.

Thus, in order to keep a balance between the power consumed by the microgrid and the power generated by the virtual generator 1, block 230 of the control law may make the renewable power source 2 limit the power that it delivers to a power P$_{srsatmax}$. The power P$_{srsatmax}$ being entirely consumed by the microgrid. In such a case, the control law allows the voltage V$_{ref}$ to be applied to the first terminals to be determined such that all of the power delivered by the renewable power source 2 is entirely consumed by the microgrid.

Block 250 of the control law is also capable of ensuring a minimum state of charge, SoC$_{min}$, of the accumulation system 3 so as to guarantee correct operation of the virtual generator 1. To this end, the control law may limit the active power P, P$_{meca}$, delivered by the inverter 4, so as to divert a portion of the power delivered by the renewable power source 2 towards the accumulation system 3 so as to re-establish a sufficient state of charge of the latter. This results in the virtual engine torque of the virtual generator 1 being acted upon (limited), in order to limit the power generated by the virtual generator 1 towards the microgrid.

In a particularly advantageous manner, the nominal state of charge SoC$_{nom}$ may be related to a power that has to be delivered to the microgrid in the starting phase, of duration T, of a generator set also connected to the microgrid. More particularly, the nominal state of charge, SoC$_{nom}$, of the accumulation system 3 may be defined as the maximum active power that the generator set is able to deliver in a duration T when it is operating at full speed. The starting phase of a generator set is understood to mean starting, warming up and synchronizing the current and the voltage with respect to the microgrid. Thus, as soon as the renewable power source 2 substantially decreases its power generation, the accumulation system 3 takes over and in turn delivers the power required to supply the microgrid.

As soon as the state of charge of the accumulation system falls below the nominal state of charge SoC$_{nom}$, the generator set may receive the order to start up. This sequence thus makes it possible to ensure a continuous supply of current and voltage in a stable manner. To this end, the control law is capable of detecting any decrease in the generation of power (power deficit) by the renewable power source 2, and makes the accumulation system 3 compensate for the power deficit. The control law detects, for example, the power deficit by measuring the current I$_{pv}$ at the first output terminals 2a. The generator set may receive the order to start up as soon as the power available in the accumulation system falls below a threshold state of charge SoC$_s$.

Thus, the control law continuously determines the state of charge SoC of the accumulation system 3 by measuring the voltage V$_{PS}$ at the output terminals of the storage system 3a. In parallel, the control law regulates the voltage V$_{ref}$ so as to ensure that the power consumed by the microgrid and the power delivered by the virtual generator 1 are in balance.

Thus, when the state of charge SoC of the accumulation system 3 is lower than SoC$_{max}$, the control law makes the renewable power source 2 deliver all the power that it is able to generate by adjusting the voltage V$_{ref}$. As soon as the state of charge SoC reaches the value SoC$_{max}$, the control law of the accumulation system 3 adjusts the voltage V$_{ref}$ so that the power delivered by the renewable power source 2 is entirely consumed by the microgrid.

Thus, in a particularly advantageous manner, the invention also allows the inverter, even when in a saturated state, to operate in parallel to the other power sources and thus keep the microgrid stable. This result is achieved by saturating the virtual engine torque of the virtual generator 1 so that the maximum virtual mechanical power that the inverter is able to deliver is always lower than a maximum electrical power. Said maximum power being a characteristic associated with the maximum current that an inverter is able to deliver without risking damage. Thus, even if the virtual generator becomes saturated, acting on the virtual mechanical torque with the intention of limiting the power that said inverter is able to deliver allows the microgrid to be kept stable.

Thus, according to the present invention, it is possible to obtain a virtual generator 1 having the stability of a generator set. More particularly, the virtual generator 1 according to the invention makes it possible to reduce the impact of fluctuations in power from the renewable power source on the microgrid.

Furthermore, in the event of a power draw by the microgrid, the virtual generator 1 reacts like a generator set. It adjusts, in a first instance, the frequency f of the current and of the voltage that it delivers to a lower frequency f in order to respond to the power draw, extracting power from the power reserve of the accumulation system 3. This potential to respond to the power draw by the microgrid endows the virtual generator 1 with the inertia of a generator set. The inertia of the virtual generator 1, according to the invention, is governed by the differential equations of the control law and the power accumulation system 3. A virtual generator 1 without an accumulation system 3 has no inertia, and is consequently unable to respond to a power draw by the microgrid.

Thus, the spinning reserve of the virtual generator 1 makes it possible to respond favourably to an increase in power consumption by the microgrid.

The operational flexibility thus conferred on the virtual generator 1 paves the way for an increase in the degree of penetration of renewable power sources.

Thus, as soon as the renewable power source substantially decreases or ceases generation of electrical power, the virtual generator 1 according to the invention has the power required to supply the microgrid available while the generator set is in the starting phase.

Thus, in cycles in which substantial amounts of electrical power are generated by the renewable power sources 2, it is possible to have a large proportion, for example 100%, of the generated electrical power arising from renewable power sources 2 (which results in the generator sets being shut down). A high degree of penetration of renewable power 2 is spoken of. The generator sets are used only in the event that insufficient electrical power is generated by the renewable power sources. The inertia of the virtual generator 1 resulting from the accumulation system and the control law thus endows it with the stability required for the grid to operate correctly.

The virtual generator 1 is subject to the control law making it possible to continuously detect fluctuations in the electrical power generated by the renewable power source. The control law thus operates the accumulation system so that it also delivers electrical power during a trough in the power generated by the renewable power source. The accumulation system compensating for fluctuations makes it possible to endow the control method with the inertia observed in a synchronous generator, such as a generator set; the stability of a power generation system based on at least one renewable power source is also spoken of.

REFERENCES

[1] Hussam Alatrash et. al., "Generator Emulation Controls for Photovoltaic Inverters", IEEE TRANSACTIONS ON SMART GRID, Vol. 3, No. 2, June 2012;
[2] PRABHA KUNDUR, "Power System Stability and Control", ISBN 0-07-035958-X;
[3] WO 2012116559 A1.

The invention claimed is:

1. A method for controlling a virtual generator comprising at least one renewable power source, an accumulation system comprising:
   a power and/or energy reserve, an inverter and a control law, the virtual generator delivering to a microgrid an active P/reactive Q electrical power with a voltage V and a current I, said voltage V and current I having a frequency f, said active/reactive electrical power controlling, via droop control, the frequency f and the RMS voltage $V_{rms}$ of the voltage V, respectively;
   controlling the virtual generator via the control law for which said virtual generator carries out an adjustment of the active/reactive power delivered to the microgrid, said adjustment compensating for a variation in the active/reactive power consumed by the microgrid, wherein the accumulation system applies a DC voltage $V_{ref}$ to first terminals of the renewable power source so that the renewable power source delivers a power $P_{sr}$, said power $P_{sr}$ being liable to exhibit power fluctuations, the accumulation system being controlled in order to compensate for said fluctuations, in which the voltage $V_{ref}$ is determined by a voltage sweep of the first output terminals, and by simultaneously measuring the amperage of the current produced by the renewable power source and said voltage $V_{ref}$.

2. The method according to claim 1, in which the control law is capable of endowing the virtual generator with the possibility to form the grid via the inverter.

3. The method according to claim 1, in which the control law is capable of connecting the virtual generator in parallel with generator sets.

4. The method according to claim 1, in which the DC voltage $V_{ref}$ applied to the first output terminals is the result of the conversion of a DC voltage $V_{PS}$, at the terminals of a storage system, by a DC/DC converter, the storage system and the DC/DC converter being included within the accumulation system.

5. The method according to claim 1, in which the voltage $V_{ref}$ is determined as a function of a setpoint power $P_{sr}$ that the renewable power source must be deliver, the voltage being imposed by the accumulation system.

6. The method according to claim 1, in which the voltage sweep produces power variations in the power delivered by the renewable power source, the accumulation system is controlled in order to compensate for said variations during said sweep.

7. The method according to claim 1, comprising a step of measuring a state of charge of the accumulation system.

8. The method according to claim 1, in which the voltage $V_{ref}$ is adjusted so that, when the state of charge of the accumulation system is above or equal to a predetermined maximum charge threshold $SoC_{max}$, the power $P_{sr}$ is entirely consumed by the microgrid.

9. The method according to claim 1, in which the state of charge of the accumulation system is maintained at a value that is higher than a minimum state of charge $SoC_{min}$.

10. The method according to claim 1, in which a power $P_{ace}$ is delivered by the accumulation system to the microgrid, via the inverter, when said microgrid has to consume extra power $P_{sur}$ that the renewable power source is unable to provide.

11. A virtual generator delivering an active P/reactive Q electrical power, with a voltage of frequency f and RMS voltage Vrms, to a microgrid comprising:
    a renewable power source;
    an accumulation system comprising a power and/or energy reserve;
    an inverter;
    a control law;
    the control law controlling the virtual generator so that the virtual generator delivers an active P/reactive Q electrical power having a voltage V and a current I to the microgrid, said voltage V and current I having a frequency f, said active P/reactive Q electrical power controlling, via droop control, the frequency f and the RMS voltage Vrms of the voltage V, respectively, and that the virtual generator carries out an adjustment of the active/reactive power delivered to the microgrid when a variation in the active/reactive power consumed by the microgrid occurs, said adjustment compensating for the variation in the active/reactive power consumed, wherein the accumulation system comprises a storage system and a DC/DC converter, the DC/DC converter connecting the output terminals of the storage system to first output terminals of the renewable power source, and the accumulation system delivering a voltage $Y_{ref}$ to the first output terminals, according to a setpoint imposed by the control law, from a DC voltage $V_{PS}$ delivered to the output terminals of the storage system, in which the accumulation system carrying out a voltage sweep of the first output terminals, and of simultaneously measuring the amperage of the current produced by the renewable power source and said voltage.

12. The virtual generator according to claim 11, in which the control law is capable of endowing the virtual generator with the possibility to form the grid via the inverter.

13. The virtual generator according to claim 11, in which the control law is capable of connecting the virtual generator in parallel with generator sets.

14. The virtual generator according to claim 11, in which the control law is capable of determining the voltage $V_{ref}$ as a function of a setpoint power $P_{sr}$ that must be delivered by the renewable power source via the accumulation system.

15. The virtual generator according to claim 11, in which the control law is capable of making the accumulation system compensate for fluctuations in the power delivered by the renewable power source.

16. The virtual generator according to claim 11, in which the renewable power source comprises photovoltaic panels.

17. The virtual generator according to claim 11, in which the renewable power source comprises wind turbines.

* * * * *